(12) United States Patent
Wang et al.

(10) Patent No.: US 12,323,402 B2
(45) Date of Patent: Jun. 3, 2025

(54) MACHINE LEARNING-BASED ENCODING/ENCRYPTION KEY GENERATION

(71) Applicant: AT&T Intellectual Property I, L.P., Atlanta, GA (US)

(72) Inventors: Wei Wang, Harrison, NJ (US); Mikhail Istomin, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 463 days.

(21) Appl. No.: 17/731,558

(22) Filed: Apr. 28, 2022

(65) Prior Publication Data

US 2023/0353547 A1 Nov. 2, 2023

(51) Int. Cl.
*H04L 9/40* (2022.01)
*H04L 9/08* (2006.01)
*H04L 9/14* (2006.01)

(52) U.S. Cl.
CPC ........ *H04L 63/0478* (2013.01); *H04L 9/0816* (2013.01); *H04L 9/14* (2013.01)

(58) Field of Classification Search
CPC ..... H04L 63/0478; H04L 9/0816; H04L 9/14; H04L 9/0656; H04L 9/0869; H04L 9/088
See application file for complete search history.

(56) References Cited

U.S. PATENT DOCUMENTS

| | | | |
|---|---|---|---|
| 9,225,691 B1* | 12/2015 | Balasubramanian | H04L 9/3239 |
| 11,470,053 B2* | 10/2022 | Karame | G06N 3/04 |
| 2013/0061045 A1* | 3/2013 | Kiefer | H04N 21/6334 713/160 |
| 2018/0287738 A1* | 10/2018 | Xu | H04L 1/0064 |
| 2019/0393903 A1* | 12/2019 | Mandt | H03M 7/30 |
| 2020/0212933 A1* | 7/2020 | Dai | H04L 1/0067 |

OTHER PUBLICATIONS

Gupta, C., "Shallow Encoder Deep Decoder (SEDD) Networks for Image Encryption and Decryption", Computer Science, Machine Leaning, v2, May 17, 2020, arXiv:2001.03017v2, 8 pages.

\* cited by examiner

*Primary Examiner* — Abiy Getachew

(57) ABSTRACT

A processing system may obtain a first source data and encoding the first source data in accordance with a first key via an encoder associated with an encoder-decoder model to generate a first source data encoding that is a first output of the encoder and a second key that is a second output of the encoder. The processing system may then transmit the first source data encoding to a recipient system, where the second key is for generating a second source data encoding for transmission by the processing system to the recipient system. A processing system may also obtain a first encoded source data from a sending system, apply the first encoded source data and a first key as inputs to a decoder associated with an encoder-decoder model to obtain a first decoded source data and a second key as outputs, and present the first decoded source data.

20 Claims, 5 Drawing Sheets

MACHINE LEARNING-BASED ENCODING/ENCRYPTION KEY GENERATION

The present disclosure relates generally to secure network-based communications, and more particularly to methods, computer-readable media, and apparatuses for encoding a first source data in accordance with a first key via an encoder associated with an encoder-decoder model to generate a first source data encoding for transmission to a recipient and a second key that is for use in generating a second source data encoding via the encoder for transmission to the recipient, and to methods, computer-readable media, and apparatuses for applying a first encoded source data and a first key as inputs to a decoder associated with an encoder-decoder model to obtain a first decoded source data and a second key that is for use in obtaining a second decoded source data via the decoder.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
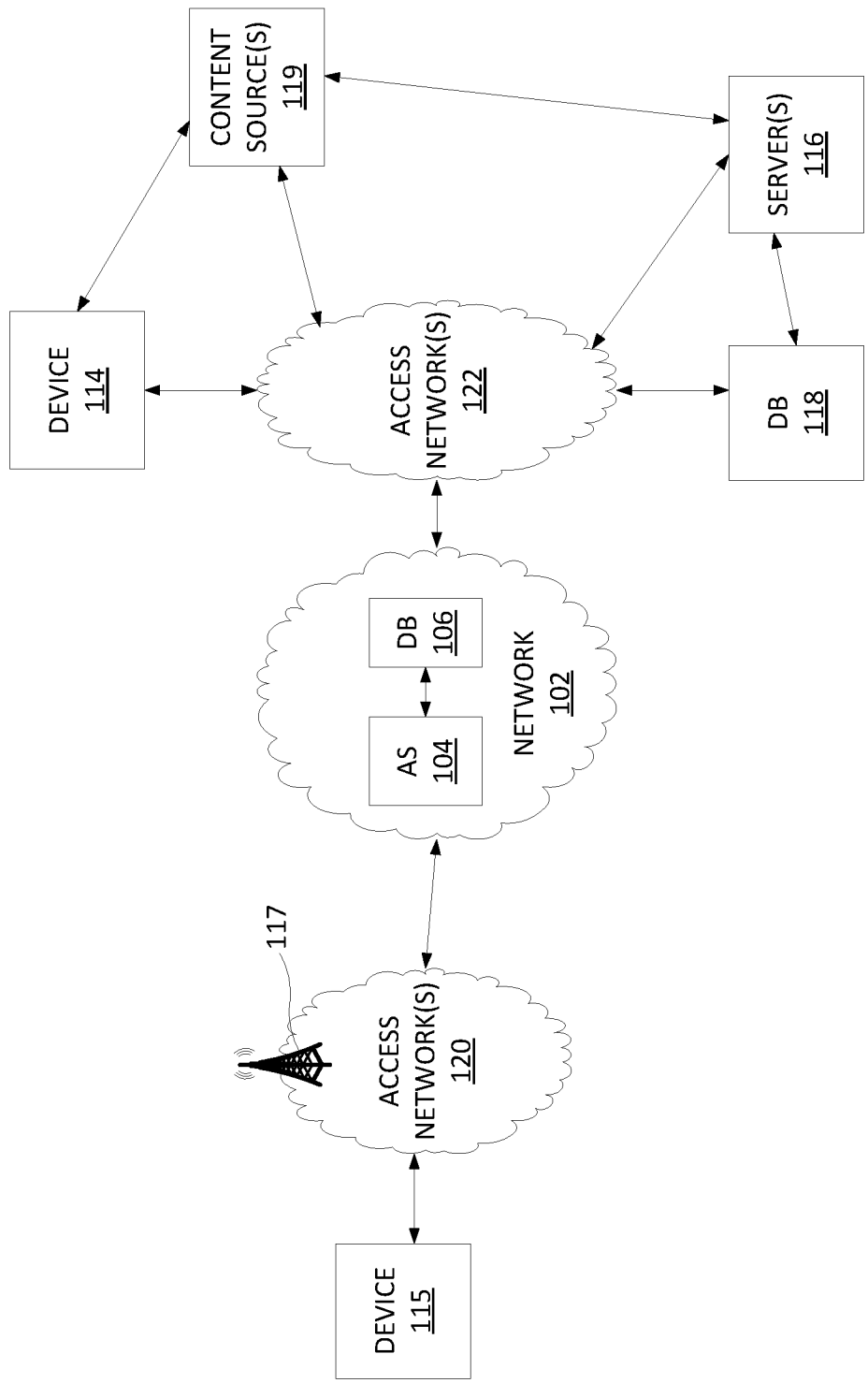
FIG. 1 illustrates an example network related to the present disclosure.

In one example, the present disclosure describes a method, computer-readable medium, and apparatus for encoding a first source data in accordance with a first key via an encoder associated with an encoder-decoder model to generate a first source data encoding for transmission to a recipient and a second key that is for use in generating a second source data encoding for transmission to the recipient. For example, a processing system including at least one processor may obtain a first source data and encoding the first source data in accordance with a first key via an encoder associated with an encoder-decoder model to generate a first source data encoding that is a first output of the encoder and a second key that is a second output of the encoder. The processing system may then transmit the first source data encoding to a recipient system, where the second key is for generating a second source data encoding for transmission by the processing system to the recipient system.

In another example, the present disclosure describes a method, computer-readable medium, and apparatus for applying a first encoded source data and a first key as inputs to a decoder associated with an encoder-decoder model to obtain a first decoded source data and a second key that is for use in obtaining a second decoded source data via the decoder. For example, a processing system including at least one processor may obtain a first encoded source data from a sending system, apply the first encoded source data and a first key as inputs to a decoder associated with an encoder-decoder model to obtain a first decoded source data and a second key as outputs, and present the first decoded source data.

Encryption and encoding are used to share data securely. However, a common/shared key is typically agreed upon by the sending and receiving parties. In addition, this is repeated each time communication is reestablished or when any changes to an encoding process occur. Key reestablishment may require both sides to communicate directly with each other again, which may be challenging when it is difficult to set-up secure communication channels (e.g., non-networked facilities).

Multiple keys can be agreed upon ahead of time, such as a one-time pad (e.g., a set of single-use codes). However, such approach puts a limit on the number of possible communications. Furthermore, communications are vulnerable to the possibility of future, yet-unused keys being compromised, rendering any further communications suspect to malicious actions. In contrast, one-time passcodes or passwords (OTP) are frequently used as part of a two-factor authentication (2FA). Once initial setup is complete, the process does not require re-sharing the keys between two parties (e.g., client and server). During the initial setup process, the client application and the server are synchronized, allowing both sides from that point forward to generate the same universally unique key(s). On the other hand, a generated key is generally only complex enough to verify authenticity of the device. Thus, such a key may be a poor choice for use as an encryption/encoding key, due to its simplicity.

Examples of the present disclosure provide a new unique key for each communication instance, or session, without the need for both sides to repeatedly communicate to re-synch keys. In particular, examples of the present disclosure provide a machine learning (ML)/artificial intelligence (AI)-based automatic key generation, where an origin/seed key is synchronized once, at the beginning of a first session between two communicating parties. From that point, at the end of each session, a new key for the next session is automatically generated. To illustrate, examples of the present disclosure may train and deploy an encoder/decoder model or network, e.g., where the encoder portion of the encoder/decoder is used on a sender/source side, and the decoder portion of the encoder/decoder is used on the recipient/receiver side. Notably, the encoder may learn to generate each next round key on the fly based on both previous key and data encrypted by it. Similarly, the decoder may decrypt/decode received data based upon a current key, and may generate each next round key on the fly based on the previous key and the encoded data received from the sender. The model is trained to make the keys generated on the sender side and the receiver side to be very similar (e.g., nearly identical, such as having a failure rate for generating the same key of 1 in every 10,000 instances, 1 in 100,000, 1 in 1,000,000, etc.). In one example, the model is also trained such that each next round key is different from the current round key (e.g., trained to maximize the difference from round to round) to increase the difficulty in breaking the key generation chain.

Examples of the present disclosure may train an encoder/decoder model in accordance with one or more loss functions (e.g., to minimize the loss function(s)). For instance, a first loss function may be a distance between data transmitted using a current key and data received using the current key (e.g., data_to_send_using_current_key_enc, data_to_receive_using_current_key_dec>). For example, the encoder/decoder model may be trained to minimize this distance to within a threshold loss level/error (e.g., a threshold distance between vectors representing the sent data and the received/decoded data). A second loss function may be a distance between a generated key on the encoder side and a generate key on the decoder side for use in a next round of data transmission (e.g., <next_key_enc, next_key_dec>). For example, the encoder/decoder model may be trained to minimize this distance to within a threshold loss level/error (e.g., a threshold distance between vectors representing the encoder-generated key and the decoder-generated key). Still another loss function may be a similarity metric between a current key and a next key (e.g., <current_key_enc, next_key_enc>). For instance, the encoder/decoder model may be trained to minimize a similarity measure to within a threshold similarity measure or score (e.g., where the similarity metric may be an inverse of a distance metric). Alternatively, or in addition, the minimization of a similarity measure may comprise a maximization of a distance measure between the current key and a next key.

In one example, the encoder/decoder model may be further trained to minimize the distance between data transmitted using a next key and data received using a next key (e.g., <data_to_send_using_next_key_enc, data_to_receive_using_next_key_dec>). For example, the encoder/decoder model may be trained to minimize this distance to within a threshold loss level/error (e.g., a threshold distance between vectors representing the next sent data and the next received/decoded data). In one example, a loss of data transmitted using a current key and data received using a random key may also be implemented in the model training process (e.g., <data_to_send_using_current_key_enc, data_to_receive_using_random_key_dec>). For instance, the encoder/decoder model may be trained to maximize this distance (e.g., such that on average, the distance is no less than X). In one example, the training process may minimize the weighted sum of all or a portion of the above loss functions.

Examples of the present disclosure approximate a one-time pad encryption process while simplifying setup, maintenance, and recovery (e.g., in cases of desynchronization or compromise). Examples of the present disclosure may be used for transmitting and receiving secure emails or text messages, securely downloading and/or sharing files, streaming videos, authenticating senders, and so forth. These and other aspects of the present disclosure are described in greater detail below in connection with the examples of FIGS. 1-5.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a core network of a telecommunication network. The network 102 may be in communication with one or more access networks 120 and 122, and the Internet (not shown). In one example, network 102 may combine core network components of a cellular network with components of a triple play service network, where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like. In one example, each of access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 120 may include a wireless access point 117 (e.g., a cellular base station).

In one example, the access networks 120 may be in communication with various devices or computing systems/processing systems, such as device 115, content source(s) 119, and so forth. Similarly, access networks 122 may be in communication with one or more devices or processing systems (e.g., computing systems), e.g., device 114, server(s) 116, database (DB) 118, etc. Access networks 120 and 122 may transmit and receive communications between device 115, device 114, content source(s) 119, server(s) 116 and/or database (DB) 118, application server (AS) 104 and/or database (DB) 106, other components of network 102, devices reachable via the Internet in general, and so forth.

In one example, each of the devices 114 and 115 may comprise a mobile computing device, a cellular smart phone, a laptop, a tablet computer, a desktop computer, a wearable computing device (e.g., a smart watch, a smart pair of eyeglasses, etc.), an application server, a bank or cluster of such devices, or the like. In accordance with the present disclosure, each of the devices 114 and device 115 may comprise a computing system or server, such as computing system 500 depicted in FIG. 5, and may be configured to perform operations or functions for encoding a first source data in accordance with a first key via an encoder associated with an encoder-decoder model to generate a first source data encoding for transmission to a recipient and a second key that is for use in generating a second source data encoding via the encoder for transmission to the recipient (such as illustrated and described in connection with the example method 300 of FIG. 3) and/or for applying a first encoded source data and a first key as inputs to a decoder associated with an encoder-decoder model to obtain a first decoded source data and a second key that is for use in obtaining a second decoded source data via the decoder (such as illustrated and described in connection with the example method 400 of FIG. 4). For instance, device 115 may include an application (app), a browser plug-in, or the like for ML-based key generation in accordance with the present disclosure, and which may establish communication with device 114, server(s) 116, and/or content source(s) 119 to transmit and/or receive various data content.

Figure 5:
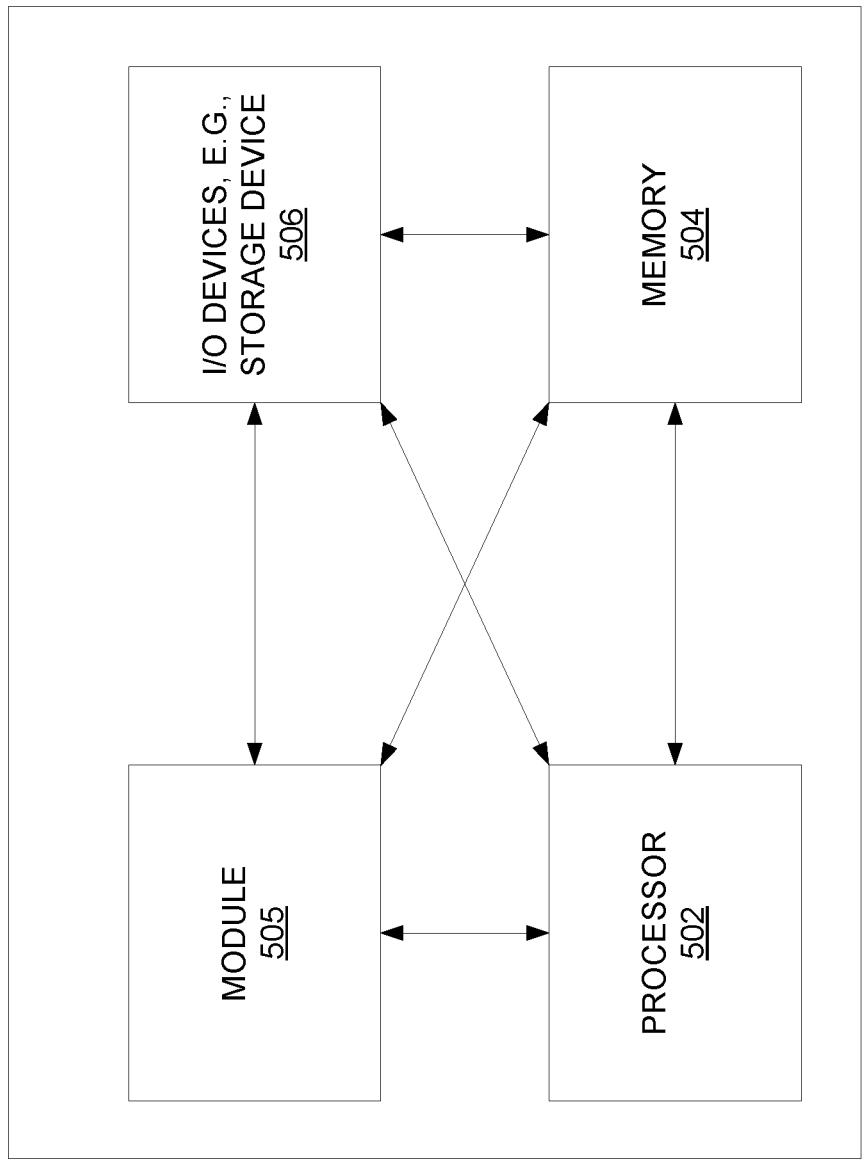
FIG. 5 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

Content sources 119 may comprise one or more servers providing one or more types of content, such as text, audio, video, multimedia, etc. For instance, content may include blogs, video logs (v-logs), podcasts, text, video, audio news stories, articles, digital books or magazines, and so forth. For instance, content sources 119 may comprise one or more servers (e.g., a web server). In one example, content sources 119 may each include or may collectively include a database comprising one or more physical storage devices integrated with such a server, or servers (e.g., database server(s)), attached or coupled to the server(s), or remotely accessible to the server(s) to store various content, or content items, e.g., individual articles, stories, videos, audio tracks or clips, social media posts, and so forth.

Similarly, content source(s) 119 may further include one or more sensor devices and/or a sensor data database. For example, such sensors may include network-connected sensors for measuring environmental conditions, such as a thermometer, a barometer, a humidity sensor, a decibel meter, a light sensor, a microphone, a camera, and so on. In addition, such sensors may be fixed location sensors and/or mobile sensors, such as a sensor-equipped autonomous aerial vehicle (AAV) with a camera, microphone, and/or other sensors, one or more radio frequency (RF) transceivers for cellular communications and/or for non-cellular wireless communications, etc. In one example, each of the content source(s) 119 may communicate independently with access network(s) 122. In another example, one or more of the content source(s) 119 (e.g., sensor devices) may comprise a peripheral device that may communicate with remote devices, servers, or the like via access networks 120 and 122, network 102, etc. via another endpoint device, such as a smart home hub, a home gateway or router, or the like. Thus, one or more of these sensor devices may have a wired or wireless connection to another local device that may have a connection to access networks 122, such as device 114, one of the server(s) 116, or the like.

As illustrated in FIG. 1, access networks 122 may be in communication with one or more servers 116 and one or more databases (DB(s)) 118. In accordance with the present disclosure, each of the server(s) 116 may comprise a computing system or server, such as computing system 500 depicted in FIG. 5, and may individually or collectively be configured to perform operations or functions in connection with examples of the present disclosure for encoding a first source data in accordance with a first key via an encoder associated with an encoder-decoder model to generate a first source data encoding for transmission to a recipient and a second key that is for use in generating a second source data encoding via the encoder for transmission to the recipient and/or for applying a first encoded source data and a first key as inputs to a decoder associated with an encoder-decoder model to obtain a first decoded source data and a second key that is for use in obtaining a second decoded source data via the decoder. For instance, server(s) 116 may host a seed/origin key generation service via which new seed/origin keys may be provided to communicating parties periodically, upon request, or otherwise. In one example, server(s) 116 may train one or more machine learning models (MLMs) in accordance with the present disclosure. Specifically, server(s) 116 may train an encoder/decoder network/model as described herein. In one example, server(s) 116 may provide such an encoder/decoder model to requesting entities. For instance, device 115 may wish to begin using an ML-based key generation service in accordance with the present disclosure and may initially download both the encoder/decoder model from server(s) 116. It should be noted that the encoder may be used when device 115 seeks to transmit/send data, and that the decoder may be used when device 115 is to receive data.

In one example, DB(s) 118 may comprise one or more physical storage devices integrated with server(s) 116 (e.g., a database server), attached or coupled to the server(s) 116, or remotely accessible to server(s) 116 to store various types of information in accordance with the present disclosure. For example, DB(s) 118 may store training data for training an encoder/decoder model/network. To illustrate, DB(s) 118 may include a content source database that may store various content of various types, such as emails, text documents, images, videos, program packages, different types of sensor data, and so on. Such data may be used as training data by server(s) 116 for training the encoder/decoder model/network, e.g., in accordance with one or more loss functions, as mentioned above.

In an illustrative example, a user, via device 115, may seek to communicate with another user via device 114, e.g., a text message exchange, an email exchange, etc. Devices 114 and 115 may previously have obtained a same seed key, e.g., generated by one of the devices 114 or 115 and shared with the other. For instance, in one example, the seed key may be shared via a different secure channel. In another example, the seed key may be obtained by both of devices 114 and 115 from another entity, such as server(s) 116. In one example, devices 114 and 115 may engage in two-way communications. In one example, the same seed key may be used for the initial communications in both directions. In another example, different seed keys may be used for the initial communications in opposite directions. In one example, a seed key may be a random or pseudorandom sequence, e.g., of bits, bytes, and/or characters.

Continuing with the present example, device 115 may first attempt to send a text message to device 114, e.g., in response to user input(s). In one example, device 115 may first encrypt/encode the text message via an encoder of device 115 in accordance with the seed key as an input. The outputs of the encoder are the encrypted/encoded content and a next key for use in a next round of communication between the devices. Notably, the next key is based upon the current key (e.g., the seed key, in the first instance/iteration) and the text message content. The encrypted/encoded content may then be sent to device 114 via access network(s) 120, network 102, access network(s) 122, etc. It should be noted that the encrypted/encoded content may be stored temporarily and/or for longer durations at one or more intermediate processing systems. For instance, one of server(s) 116, AS 104, or the like may comprise a Short Message Service (SMS) server that may store SMS/text messages on behalf of users, and which may push such SMS/text messages to endpoint devices upon network attachment and/or from which user endpoint devices, such as device 114 may retrieve such SMS/text messages.

Upon receiving the encrypted/encoded content, device 114 may apply the encrypted/encoded content and seed key as inputs to a decoder of device 114. The outputs of the decoder may comprise the next key (e.g., the same key as generated by the encoder) and the text message (e.g., a decoded/decrypted version of the text message). It should be noted that the next key is based upon the current key (e.g., the seed key, in the first instance/iteration) and the encrypted/encoded content. The text message may then be presented via device 114, e.g., on a notification screen, in response to a user input, etc.

Figure 2:
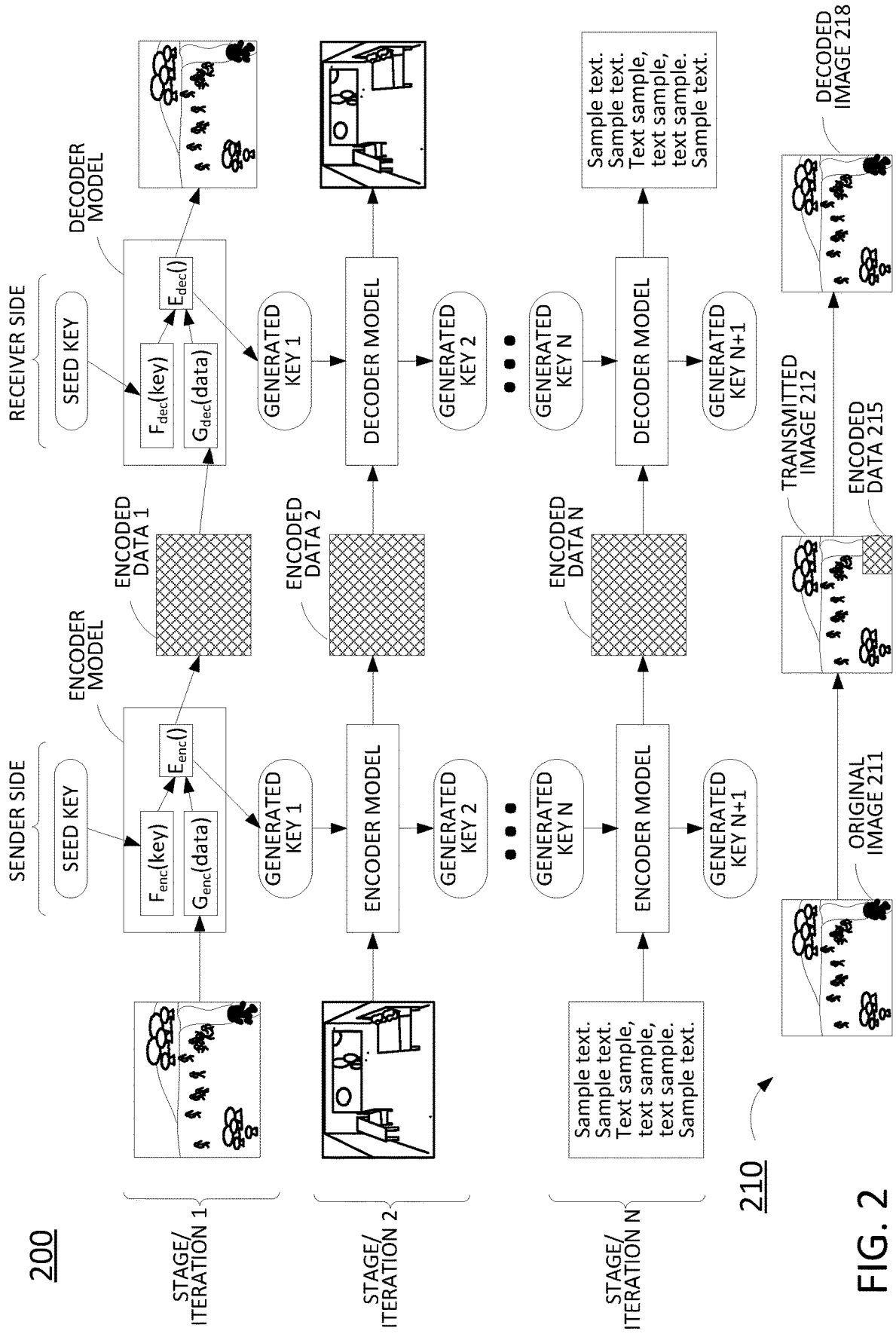
FIG. 2 illustrates an example process having several iterations/rounds of content transmission and reception, and corresponding key generation, encoding, and decoding, as well as an example iteration of sharing of an image with partial encoding, in accordance with the present disclosure.

The same or substantially similar process may be used for a next text message from device 115 to device 114. For instance, the same process may be followed, but the next key may be used as input to the encoder (along with the next text message). Similarly, the next key may be used as an input to the decoder at device 114 (along with the encoded next text message obtained from device 115). In addition, the same or substantially similar process may be used for any text messages send from device 114 to device 115 in a reverse direction. In one example, the first text message in such direction may use the seed key for encoding/encryption (e.g., the same seed key used for the first text message from device 115 to device 114, or a different seed key), and any subsequent key may be generated from: (1) a prior key and (2) the previous sent text message content. In another example, a next key for use in text message communications between devices 114 and 115 may be a next key that is generated on either end from a communication in either direction. In particular, since both devices 114 and 115 have the same encoder and also have the same decoder, either device may generate a next key from: (1) a previous key, and (2) either the content to be encoded (on a sender side), or encoded content to be decoded (on a receiver side). It should be noted that FIG. 2 illustrates an example process 200 having several iterations/rounds of content transmission and reception (and corresponding key generation, encoding, and decoding). In addition, although the example of FIG. 2 primarily relates to transmission of images, the principles are equally applicable to other examples, such as the foregoing, which relates to text message communications between devices 114 and 115.

Referring again to FIG. 1, in another illustrative example device 115 may seek to download a video from one of the content sources 119. As in the previous example, device 115 and the one of the content sources 119 may both have encoder and decoder portions of an encoder/decoder network/model, and may have previously obtained a same seed key. Accordingly, in one example, the one of the content sources 119 may, via its encoder, encrypt/encode the video using the seed key. In one example, the video content may be segregated into a plurality of blocks for encoding, e.g., having a quantity of data not to exceed a maximum packet size, a maximum segment size, maximum transmission unit size, etc. for transmission via one or more networks. In one example, the encoder may also output a next key. The blocks may then be transmitted to device 115, where device 115 may then decode/decrypt in accordance with the seed key. Similarly, device 115 may also obtain the next key as an additional output of the decoder. As such, the one of the content sources 119 may use the next key to encode/encrypt a next video that device 115 seeks to obtain from the one of the content sources 119. Likewise, device 115 may use the next key to decode/decrypt an encoded/encrypted instance of the next video that may be transmitted to device 115 by the one of the content sources 119.

Other illustrative examples in connection with FIG. 1 may include device 115 obtaining sensor data from a sensor data source (e.g., another one of the content sources 119), device 115 obtaining a new application program from a download server, such as one of the content sources 119, server(s) 116, or the like, and so on. It should again be noted that any number of server(s) 116 or database(s) 118 may be deployed. In one example, network 102 may also include an application server (AS) 104 and a database (DB) 106. In one example, AS 104 may perform the same or similar functions as server(s) 116. Similarly, DB 106 may store the same or similar information as DB(s) 118 (e.g., content source database(s), etc.). For instance, network 102 may provide a ML-based key generation service to subscribers and/or other users, e.g., in addition to television, phone, and/or other telecommunication services. In one example, device 114, device 115, AS 104, DB 106, server(s) 116, DB(s) 118, and/or content source(s) 119, may operate in a distributed and/or coordinated manner to perform various steps, functions, and/or operations described herein.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like, for packet-based streaming of videos, music or other audio, or other content in accordance with the present disclosure. Similarly, although only two access networks 120 and 122 are shown, in other examples, access networks 120 and/or 122 may each comprise a plurality of different access networks that may interface with network 102 independently or in a chained manner. For example, device 114, content source(s) 119, and server(s) 116 may be in communication with network 102 via different access networks, and so forth. Thus, these and other modifications are all contemplated within the scope of the present disclosure.

Referring now to FIG. 2, an example process 200 illustrates several iterations/rounds of content transmission and reception (and corresponding key generation, encoding, and decoding). For instance, both a sender side (e.g., a source or source device) and a receiver side (e.g., a receiver, recipient, or recipient device) may be initialized, or synchronized with a same seed key. In a first stage, or iteration, the sender side may obtain a first image for transmission to the receiver side. For instance, the sender side may comprise a media server from which the receiver side may request one or more images. Alternatively, the sender side may represent a user endpoint device via which a user may select one or more pictures to share with the receiver side, e.g., via a Multimedia Messaging Service (MMS) message, an image sharing application (app), a social media application, or the like. The sender side may encrypt/encode the image using the seed key via an encoder, or encoder model. For instance, the image and seed key may comprise two inputs to the encoder model. The outputs are a first generated key (generated key 1) and an encoded/encrypted instance of the image (encoded data 1). The functions F, G, E in the encoder model can be of any building blocks for neural networks, such as linear layers, activation layers, convolutional layers, or a combination thereof. The encoded instance of the image (encoded data 1) may be transmitted to the recipient (receiver side). The receiver side may then input the encoded data 1 and seed key to its decoder (or decoder model). The functions F, G, E in the decoder model can be of any building blocks for neural networks, such as linear layers, activation layers, convolutional layers, or a combination thereof. The outputs are the first generated key (generated key 1), and the image (e.g., a decoded/decrypted instance of the original image transmitted at stage/iteration 1).

In stage/iteration 2, the sender side may encode a second image using the first generated key (generated key 1) via the encoder model. The outputs are a second generated key (generated key 2) and an encoded instance of the second image (encoded data 2). The encoded instance of the second image (encoded data 2) may be transmitted to the recipient (receiver side). The receiver side may then input the encoded data 2 and generated key 1 to its decoder (or decoder model). The outputs are the second generated key (generated key 2), and the second image (e.g., a decoded instance of the original second image transmitted at stage/iteration 2). It should be noted that the same or similar process may continue through multiple iterations of communication from the sender side to the receiver side. In an example in which both parties engage in two-way communications, a similar process may be used in the reverse direction of data transmission/reception.

The example of FIG. 2 further illustrates that the process may continue over many iterations, e.g., to "N" iterations, "N+1" iterations, and so on. In addition, it should be noted that in one example, an encoder/decoder model (e.g., the encoder model-decoder model pair) may be specific to a particular type of data to be shared. In other words, there may be separate encoder/decoder models for images, videos, documents, application/program files, and so forth. However, as illustrated in FIG. 2, in one example the same encoder/decoder model may be used for sharing of multiple different types of data. For instance, the encoder model and decoder model illustrated in the process 200 may be used to share images in stages 1 and 2, and similarly text content in the example stage/iteration N.

As noted above, after many iterations (e.g., after 1,000 iterations, after 10,000 iterations, etc. and/or after 30 days of use, 90 days of use, etc.) decoded images, text, or the like may potentially become inaccurate and there may be inconsistencies significant enough to be noticed, which may call for renegotiating/resharing of a new seed/origin key between parties. One trigger for resharing an origin/seed key is a manual input by recipient that received data that is not of sufficient quality according to the recipient (e.g., a human user). In one example, there may be a time-based resharing of a new seed key (e.g., at least once every month, every 2 months, etc.). In one example, the sender side may periodically send a hash of an original image or other data (e.g., out of band). The receiver side may then check the hash to see if there is any data drift. In one example, a provider of the encoder/decoder model may set a seed key resharing time period or a maximum number of uses before seed key resharing is activated based upon the accuracy of the model as trained (e.g., a 1 in 100,000 chance of failure per training may then be basis for a threshold of every 1,000 messages before resharing), in order to provide a low likelihood of failure in deployment.

FIG. 2 additionally illustrates an example iteration 210 of sharing of an image with partial encoding. The iteration 210 may relate to the same sender side and receiver side as the example process 200. However, for ease of illustration, the keys, encoder model, and decoder model are omitted from the present example. Notably, iteration 210 may relate to an example in which the parties are not interested in encoding/encrypting the image itself, but may rather use ML generated keys for authenticating the sender side. For instance, the sender side may wish to transmit the original image 211 to the receiver side, but is not concerned with maintaining confidentiality thereof. For example, a user may wish to share a picture with a friend, but the picture may be in the public domain. In this example, instead of encoding/encrypting the entire original image 211 using a current key, the sender side may encode/encrypt only a small portion of the original image via the encoder (and may also obtain the next key), and then transmit the partially encoded image to the receiver side. It should be noted that the next key is based upon the current key and the portion of the original image corresponding to the encoded data 215. In particular, the transmitted image 212 with the small encoded/encrypted portion (encoded data 215) is shown in FIG. 2. The receiver side may apply the encoded data 215 and the current key to the decoder to obtain the decoded image 218 (and to also obtain the next key, which is based upon the current key and the encoded data 215). When the decoded image 218 is coherent, the sender side may be authenticated by the receiver side. However, if the decoded image 218 instead appears like the transmitted image 212 (where the encoded data 215 does not blend with the surrounding portions of the transmitted image 212), the receiver side may know that there is a potential problem with the sender side, that the transmission was not received from a source other than the expected sender, and so forth.

Figure 3:
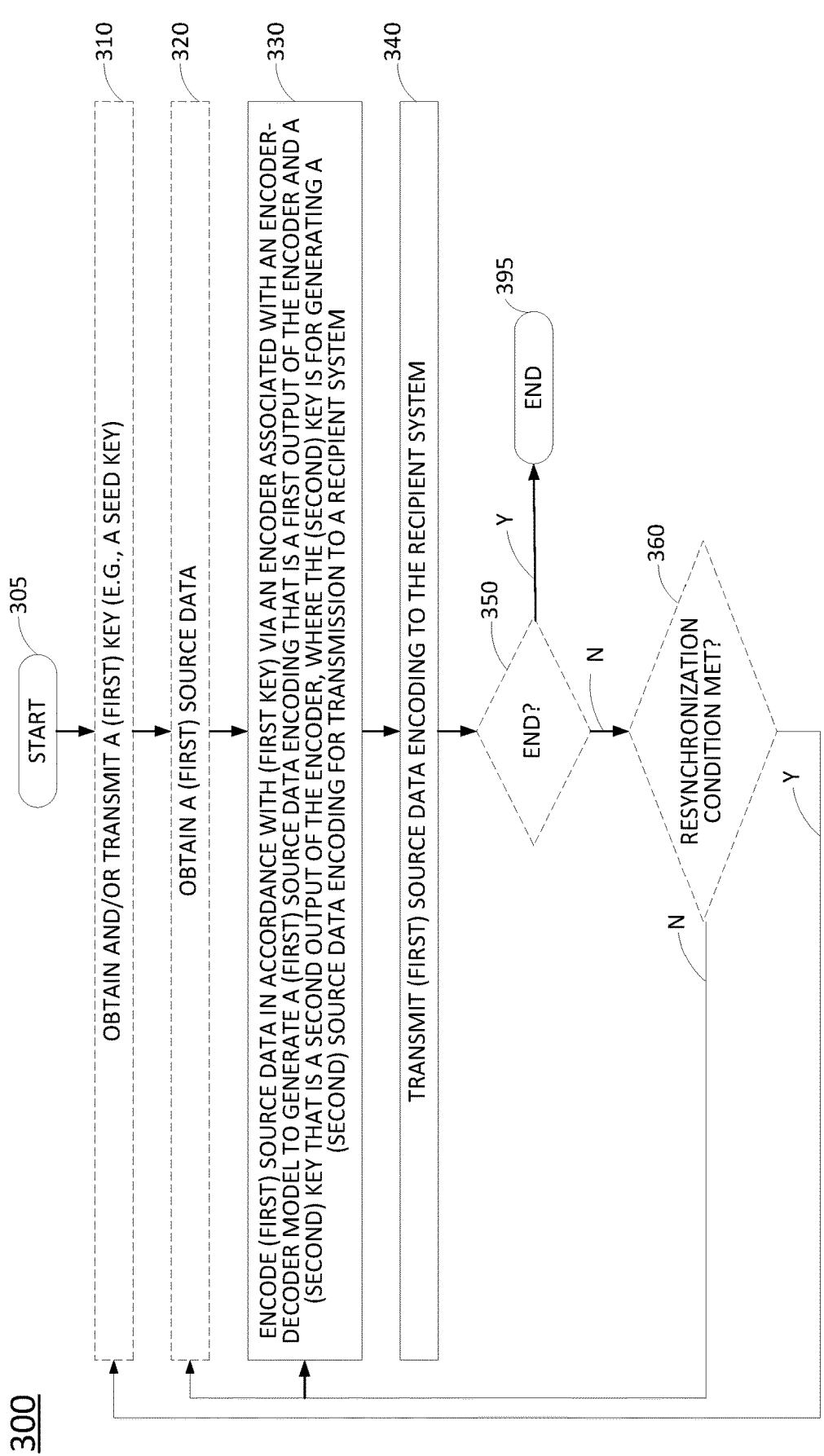
FIG. 3 illustrates a flowchart of an example method for encoding a first source data in accordance with a first key via an encoder associated with an encoder-decoder model to generate a first source data encoding for transmission to a recipient and a second key that is for use in generating a second source data encoding for transmission to the recipient.

FIG. 3 illustrates a flowchart of an example method 300 for encoding a first source data in accordance with a first key via an encoder associated with an encoder-decoder model to generate a first source data encoding for transmission to a recipient and a second key that is for use in generating a second source data encoding via the encoder for transmission to the recipient, in accordance with the present disclosure. In one example, the method 300 is performed by a component of the system 100 of FIG. 1, such as by server(s) 116, application server 104, device 114, device 115, one of the content sources 119, and/or any one or more components thereof (e.g., a processor, or processors, performing operations stored in and loaded from a memory), by one or more of such entities in conjunction with each other and/or with one or more other entities, such as DB 106, DB(s) 118, and so forth. In one example, the steps, functions, or operations of method 300 may be performed by a computing device or system 500, and/or processor 502 as described in connection with FIG. 5 below. For instance, the computing device or system 500 may represent any one or more components of a device, server, and/or application server in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 500 may collectively function as a processing system. For illustrative purposes, the method 300 is described in greater detail below in connection with an example performed by a processing system. The method 300 begins in step 305 and may proceed to optional step 310, optional step 320, or step 330.

At optional step 310, the processing system may obtain or transmit a first key, e.g., a seed key for encoding/encryption of source data for transmission to a recipient system. For instance, the processing system may generate and/or select a first key and provide the first key to the recipient system. In another example, the recipient system may provide the first key to the processing system (e.g., the sender system). In still another example, the processing system may obtain the first key from another entity, e.g., a server providing a seed/origin key generation service via which new seed/origin keys may be provided to communicating parties periodically, upon request, or otherwise.

At optional step 320, the processing system may obtain first source data. For instance, the first source data may comprise a media file (e.g., an image, video, etc.), a document file, a program file (e.g., an application, an application package, etc., such as for a productivity application, an endpoint device security application, a video game, and so forth). In one example, the first source data may comprise a portion of such file or other kind of package, such as sub-units of a program being downloaded (e.g., 100 Kb blocks), portions of a media "stream" instead of a file, a sensor data feed/stream (e.g., environmental data, biometric data, etc.), and so forth. In one example, the first source data may be obtained in response to a user input. For instance, a user may generate a text message content, may select a document, media file, program package, or other files to send to a recipient/recipient system, etc. In another example, the first source data may be obtained automatically. For instance, the processing system may receive sensor data from one or more sensors (e.g., periodically or otherwise) and may transmit the sensor data (e.g., encoded/encrypted as described herein) to one or more recipient systems (e.g., periodically or otherwise). In one example, the processing system may also store the sensor data between receiving and transmitting the sensor data. In one example, the first source data may comprise a selected region of an image or a selected region of frames of a video, a portion of a file, e.g., the first 100 Kb of a media file, etc., such as illustrated in the example iteration 210 of FIG. 2.

At step 330, the processing system encodes the first source data in accordance with the first key via an encoder associated with an encoder-decoder model to generate a first source data encoding that is a first output of the encoder and a second key that is a second output of the encoder. The encoder-decoder model may comprise, for example, an autoencoder, a shallow encoder deep decoder network, or the like. In addition, the encoder-decoder model may be trained in accordance with an information loss function associated with instances of source data, and a key loss function associated with key instances. In various examples, the encoder-decoder model may also be trained in accordance with an inverse loss function among subsequent key instances, or other loss functions, such as described above. It should be noted that the second key is for generating a second source data encoding for transmission by the processing system to the recipient in a subsequent iteration of steps of the method 300. It should also be noted that in one example, the encoder is deployed on the processing system, and thus, implemented/executed by the processing system.

At step 340, the processing system transmits the first source data encoding to the recipient system. Notably, the first source data encoding is decodable by the recipient system via the application of the first key and the first source data encoding as inputs to a decoder associated with the encoder-decoder model. For instance, the recipient system may similarly possess the first key in advance of receiving the first source data encoding. As such, a first output of the decoder is a decoded instance of the first source data. In addition, a second output of the decoder is the second key (e.g., another instance of the same second key that is generated by the processing system at step 330).

At optional step 350, the processing system may determine if the method 300 is to end. For instance, if there is no more data to transmit, the method 300 may end. In another example, the method 300 may end if a timeout period expires. If it is so determined, the method 300 may proceed to step 395 where the method ends. Otherwise, the method 300 may proceed to optional step 360 and/or to one of: optional step 310, optional step 320, or step 330.

At optional step 360, the processing system may determine whether a resynchronization condition is met. For example, the resynchronization condition may comprise an expiration of a defined period of time since the obtaining or the transmitting of the first seed key, reaching or exceeding a defined number of iterations, receiving a notification from the recipient system, or the like. The notification from the recipient system may be of a decline in quality of the first decoded source data (or a subsequent decoded instance of additional source data), e.g., as perceived by a user or as automatically detected (e.g., an automatic detection of spelling mistakes, an automatic detection of a region of an image not blending with surrounding region(s), etc.). When the resynchronization condition is met, the method 300 may return to optional step 310. For instance, the processing system may generate a new seed key and transmit the new seed key to the recipient system, or may obtain the new seed key (e.g., a "second" seed key) from the recipient system or another entity, where the second seed key is to be used instead of the second key or another key generated in a subsequent iteration of the method 300 at step 330. Otherwise, when the resynchronization condition is not met, the method 300 may return to optional step 320 or step 330.

Notably, the processing system may generate, in a plurality of iterations, first additional key instances and additional source data encodings via the encoder in accordance with additional source data. Similarly, the recipient system may generate, in the plurality of iterations, second additional key instances in accordance with the additional source data encodings (where the second additional key instances correspond to the first additional key instances in a pairwise manner). For instance, at optional step 320, the processing system may obtain second source data. In one example, the first source data and the second source data may comprise different portions of a same file or stream. In another example, the first source data and the second source data may comprise different files or streams. Accordingly, at step 330, the processing system may generate via the encoder: (1) the second source data encoding by encoding the second source data in accordance with the second key via the encoder, and (2) a "third" key (e.g., an additional key instance) as a second output of the decoder (and so on for additional iterations to obtain "third" source data, generate a "fourth" key and a "third" source data encoding by encoding the third source data in accordance with the third key via the encoder, etc.).

It should also be noted that in additional iterations, the recipient system may further generate decoded instances of the additional source data, e.g., decoded instances of the second source data, the third source data, etc., and subsequent keys. In one example, in each iteration, or after a set number of iterations, e.g., every 100 iterations, every 1000 iterations, etc.), the processing system may check at optional step 360 whether a resynchronization condition is met and may transmit or obtain a new seed key at optional step 310. As such, the method 300 may continue through a plurality of iterations indefinitely or until it is determined at optional step 350 to proceed to step 395 and end the method 300.

It should be noted that the method 300 may be expanded to include additional steps, or may be modified to replace steps with different steps, to combine steps, to omit steps, to perform steps in a different order, and so forth. For instance, in one example the processor may continue to repeat one or more steps of the method 300 for additional iterations. In one example, the method 300 may alternatively comprise the processing system returning to use the same first seed key in response to a resynchronization condition, but may encode and send nonce data, or may encode and resend the last data, e.g., solely to obtain a next key that is unique or that is practically not possible to identify. In one example, the method 300 may include obtaining training data, training the encoder/decoder model in accordance with the training data, retraining the encoder/decoder model with new training data, and so forth. In one example, the method 300 may include obtaining a request for the first source data, the second source data, or subsequent source data. For instance, the processing system may comprise a media server, a server for downloading program files, or the like. Thus, the source data may be encoded and sent to the recipient system in response to a request. In one example, the method 300 may be expanded or modified to include steps, functions, and/or operations, or other features described above in connection with the example(s) of FIGS. 1, 2, and/or 4, or as described elsewhere herein. For instance, the processing system may perform operations of both a sender system and a recipient system as described herein. Thus, these and other modifications are all contemplated within the scope of the present disclosure.

Figure 4:
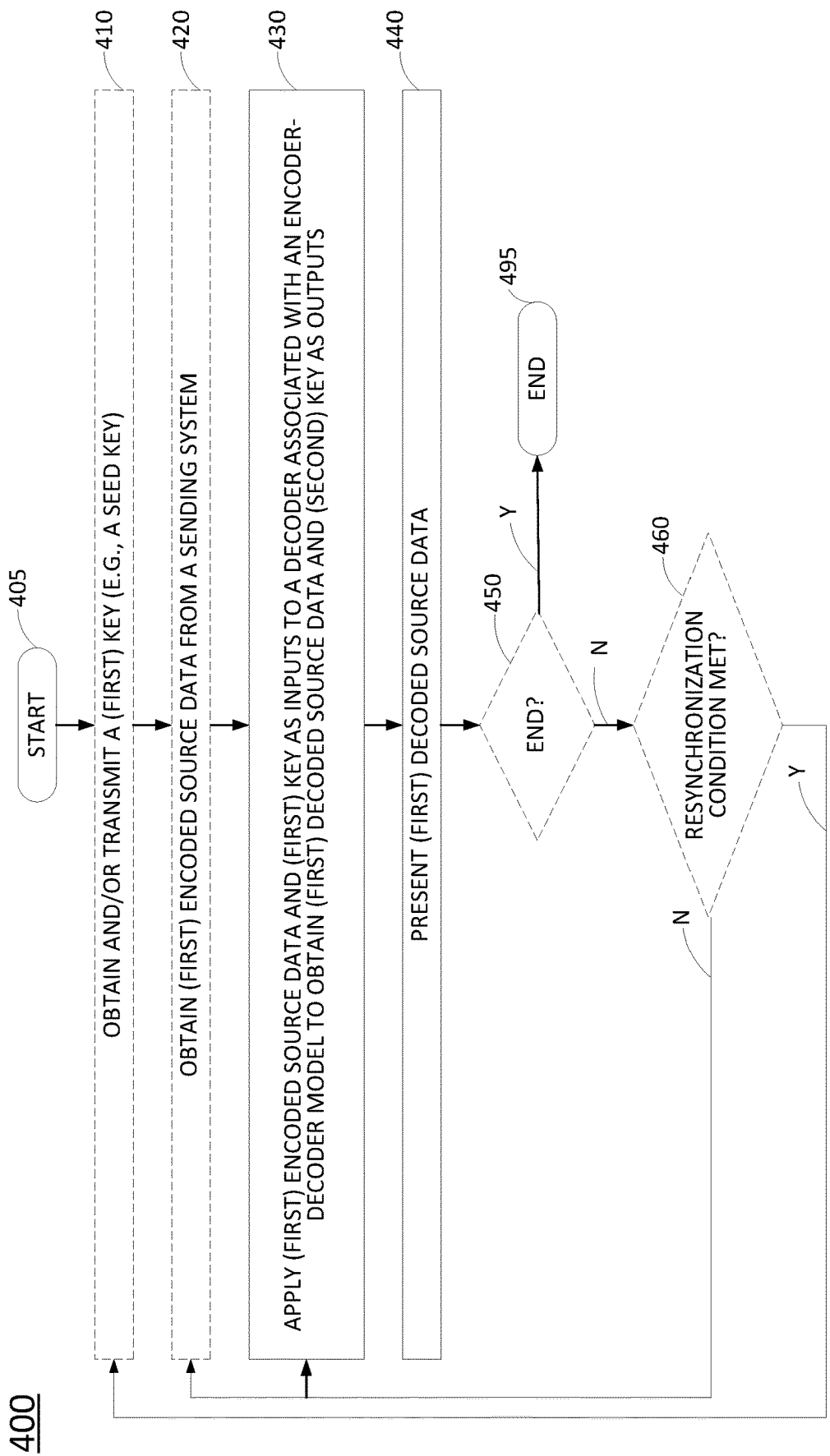
FIG. 4 illustrates a flowchart of an example method for applying a first encoded source data and a first key as inputs to a decoder associated with an encoder-decoder model to obtain a first decoded source data and a second key that is for use in obtaining a second decoded source data via the decoder.

FIG. 4 illustrates a flowchart of an example method 400 for applying a first encoded source data and a first key as inputs to a decoder associated with an encoder-decoder model to obtain a first decoded source data and a second key that is for use in obtaining a second decoded source data via the decoder, in accordance with the present disclosure. In one example, the method 400 is performed by a component of the system 100 of FIG. 1, such as by server(s) 116, application server 104, device 114, device 115, one of content sources 119, and/or any one or more components thereof (e.g., a processor, or processors, performing operations stored in and loaded from a memory), by one or more of such entities in conjunction with each other and/or with one or more other entities, such as DB 106, DB(s) 118, and so forth. In one example, the steps, functions, or operations of method 400 may be performed by a computing device or system 500, and/or processor 502 as described in connection with FIG. 5 below. For instance, the computing device or system 500 may represent any one or more components of a device, server, and/or application server in FIG. 1 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 500 may collectively function as a processing system. For illustrative purposes, the method 400 is described in greater detail below in connection with an example performed by a processing system. The method 400 begins in step 405 and may proceed to optional step 410, optional step 420, or step 430.

At optional step 410, the processing system may obtain or transmit a first key, e.g., a seed key for encoding/encryption/decoding/decryption of source data for transmission by a source system to the processing system. For instance, the processing system may generate and/or select a first key and provide the first key to the sending system. In another example, the sending system may provide the first key to the processing system (e.g., the recipient system). In still another example, the processing system may obtain the first key from another entity, e.g., a server providing a seed/origin key generation service via which new seed/origin keys may be provided to communicating parties periodically, upon request, or otherwise.

At optional step 420, the processing system may obtain first encoded source data from the sending system.

At step 430, the processing system may apply the first encoded source data and a first key as inputs to a decoder associated with an encoder-decoder model to obtain a first decoded source data and a second key as outputs. In one example, the first key is obtained at optional step 410. The encoder-decoder model may comprise, for example, an autoencoder, a shallow encoder deep decoder network, or the like. In addition, the encoder-decoder model may be trained in accordance with an information loss function associated with instances of source data, and a key loss function associated with key instances. In various examples, the encoder-decoder model may also be trained in accordance with an inverse loss function among subsequent key instances, or other loss functions, such as described above. It should also be noted that in one example, the decoder is deployed on the processing system, and thus, implemented/ executed by the processing system.

At step 440, the processing system presents the first decoded source data, e.g., via an output component of the processing system or associated with the processing system, e.g., a display screen, speaker, headset, etc.

At optional step 450, the processing system may determine if the method 400 is to end. For instance, if there is no more data to receive, the method 400 may end. In another example, the method 400 may end if a timeout period expires. If it is so determined, the method 400 may proceed to step 495 where the method ends. Otherwise, the method 400 may proceed to optional step 460 and/or to one of: optional step 410, optional step 420, or step 430.

At optional step 460, the processing system may determine whether a resynchronization condition is met. For example, the resynchronization condition may comprise an expiration of a defined period of time since the obtaining or the transmitting of the first seed key, reaching or exceeding a defined number of iterations, receiving a notification from the sender system, or the like. In one example, step 460 may comprise detecting an inconsistency of the first decoded source data (or any additional decoded source data at subsequent iterations of the method 400). For instance, the inconsistency can be detected by manual input from user or automatically by the processing system. For example, in a text document, a user may see many spelling errors, typographical errors, grammatical inconsistencies, style inconsistencies of lines, paragraphs, etc., and so on. Similarly, a user may detect that an image or video quality is noticeably degraded or is unacceptable to the user. In addition, the processing system may automatically detect spelling, grammar, formatting or other issues in a document, may detect that an image includes one or more regions that are inconsistent with the surrounding region(s), and so forth. For instance, a selected portion of an image may be encoded for indicating source integrity. Where this selected portion does not blend well with the adjacent region(s), it may be indicative that the decoding failed and that the key is wrong. This may be indicative that the image did not come from the expected source that the current key on the sender side has diverged from the current key on the receiver side, or other anomalies.

When the resynchronization condition is met, the method 400 may return to optional step 410. For instance, the processing system may generate a new seed key and transmit the new seed key to the sender system, or may obtain the new seed key (e.g., a "second" seed key) from the sender system or another entity, where the second seed key is to be used instead of the second key or another key generated in a subsequent iteration of the method 400 at step 430. Otherwise, when the resynchronization condition is not met, the method 400 may return to optional step 420 or step 430.

Notably, the processing system may obtain, in a plurality of iterations, additional source data encodings and generate, in the plurality of iterations, additional key instances and additional decoded source data as outputs of the decoder model. For instance, at optional step 420, the processing system may obtain a second encoded source data from the sending system. In one example, the first encoded source data and the second encoded source data may comprise different encoded portions of a same file or stream. In another example, the first encoded source data and the second encoded source data may be from different files or streams. Accordingly, at step 430, the processing system may apply the second encoded source data and the second key as inputs to the decoder to obtain a second decoded source data and a third key as outputs (and so on for additional iterations to obtain "third" encoded source data, generate a "fourth" key and a "fourth" decoded source data, and so forth).

In one example, in each iteration, or after a set number of iterations, e.g., every 100 iterations, every 1000 iterations, etc.), the processing system may check at optional step 460 whether a resynchronization condition is met, and may transmit or obtain a new seed key at optional step 410. As such, the method 400 may continue through a plurality of iterations indefinitely or until it is determined at optional step 450 to proceed to step 495 and end the method 400.

It should be noted that the method 400 may be expanded to include additional steps, or may be modified to replace steps with different steps, to combine steps, to omit steps, to perform steps in a different order, and so forth. For instance, in one example the processor may repeat one or more steps of the method 400 for additional iterations, and so forth. In one example, the method 400 may include obtaining training data, training the encoder/decoder model in accordance with the training data, retraining the encoder/decoder model with new training data, and so forth. In one example, the method 400 may include obtaining a request for the first source data, the second source data, or subsequent source data and transmitting the request to the sender system. For instance, the sender system may comprise a media server, a server for downloading program files, or the like. Thus, the encoded source data may be obtained by the processing system in response to a request. In one example, the method 400 may be expanded or modified to include steps, functions, and/or operations, or other features described above in connection with the example(s) of FIGS. 1-3, or as described elsewhere herein. For instance, the processing system may perform operations of both a sender system and a recipient system as described herein. Thus, these and other modifications are all contemplated within the scope of the present disclosure.

In addition, although not expressly specified above, one or more steps of the method 300 or the method 400 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIGS. 3 and 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 5 depicts a high-level block diagram of a computing device or processing system specifically programmed to perform the functions described herein. For example, any one or more components or devices illustrated in FIG. 1 or described in connection with the examples of FIGS. 2-4 may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for encoding a first source data in accordance with a first key via an encoder associated with an encoder-decoder model to generate a first source data encoding for transmission to a recipient and a second key that is for use in generating a second source data encoding via the encoder for transmission to the recipient and/or for applying a first encoded source data and a first key as inputs to a decoder associated with an encoder-decoder model to obtain a first decoded source data and a second key that is for use in obtaining a second decoded source data via the decoder, and various input/output devices 506, e.g., one or more sensors, a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for encoding a first source data in accordance with a first key via an encoder associated with an encoder-decoder model to generate a first source data encoding for transmission to a recipient and a second key that is for use in generating a second source data encoding via the encoder for transmission to the recipient and/or for applying a first encoded source data and a first key as inputs to a decoder associated with an encoder-decoder model to obtain a first decoded source data and a second key that is for use in obtaining a second decoded source data via the decoder (e.g., a software program comprising computer-executable instructions) can be loaded into memory 504 and executed by hardware processor element 502 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for encoding a first source data in accordance with a first key via an encoder associated with an encoder-decoder model to generate a first source data encoding for transmission to a recipient and a second key that is for use in generating a second source data encoding via the encoder for transmission to the recipient and/or for applying a first encoded source data and a first key as inputs to a decoder associated with an encoder-decoder model to obtain a first decoded source data and a second key that is for use in obtaining a second decoded source data via the decoder (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system including at least one processor, a first source data;
    encoding, by the processing system, the first source data in accordance with a first key via an encoder associated with an encoder-decoder model to generate a first source data encoding that is a first output of the encoder and a second key that is a second output of the encoder; and
    transmitting, by the processing system, the first source data encoding to a recipient system, wherein the second key is for generating a second source data encoding from a second source data for transmission by the processing system to the recipient system, wherein the first source data is distinct from the second source data.

2. The method of claim 1, further comprising:
obtaining, by the processing system, the first key from the recipient system or from a different remote system.

3. The method of claim 1, wherein the first source data encoding is decodable by the recipient system via an application of the first key and the first source data encoding as inputs to a decoder associated with the encoder-decoder model.

4. The method of claim 3, wherein a first output of the decoder is a decoded instance of the first source data, and wherein a second output of the decoder is the second key.

5. The method of claim 1, wherein the second source data encoding is generated by encoding the second source data in accordance with the second key via the encoder.

6. The method of claim 5, wherein:
the first source data and the second source data are different portions of a same file or stream; or
the first source data and the second source data are different files or streams.

7. The method of claim 1, wherein the processing system generates, in a plurality of iterations, first additional key instances and additional source data encodings via the encoder in accordance with additional source data, and wherein the recipient system generates, in the plurality of iterations, second additional key instances in accordance with the additional source data encodings.

8. The method of claim 7, wherein the first key comprises a first seed key, wherein the method further comprises:
obtaining a second seed key, wherein the second seed key is to be used instead of one of the first additional key instances.

9. The method of claim 8, wherein the second seed key is obtained in response to at least one of:
an expiration of a defined period of time since the obtaining of the first seed key;
reaching or exceeding a defined number of the plurality of iterations; or
a notification from the recipient system.

10. The method of claim 1, wherein the encoder-decoder model comprises:
an autoencoder; or
a shallow encoder deep decoder network.

11. The method of claim 1, wherein the encoder-decoder model is trained in accordance with an information loss function associated with instances of source data, and a key loss function associated with key instances.

12. A non-transitory computer-readable medium storing instructions which, when executed by a processing system including at least one processor, cause the processing system to perform operations, the operations comprising:
obtaining a first source data;
encoding the first source data in accordance with a first key via an encoder associated with an encoder-decoder model to generate a first source data encoding that is a first output of the encoder and a second key that is a second output of the encoder; and
transmitting the first source data encoding to a recipient system, wherein the second key is for generating a second source data encoding from a second source data for transmission by the processing system to the recipient system, wherein the first source data is distinct from the second source data.

13. A method comprising:
obtaining, by a processing system including at least one processor, a first encoded source data from a sending system;
applying, by the processing system, the first encoded source data and a first key as inputs to a decoder associated with an encoder-decoder model to obtain a first decoded source data and a second key as outputs, wherein the second key is to be used to obtain a second decoded source data from a second encoded source data, and wherein the first decoded source data is distinct from the second decoded source data; and
presenting, by the processing system, the first decoded source data.

14. The method of claim 13, further comprising:
obtaining, by the processing system, the first key from the sending system or from a different remote system.

15. The method of claim 13, further comprising:
obtaining, by the processing system, the second encoded source data from the sending system; and
applying, by the processing system, the second encoded source data and the second key as inputs to the decoder to obtain the second decoded source data and a third key as outputs.

16. The method of claim 15, further comprising:
presenting, by the processing system, the second decoded source data.

17. The method of claim 15, wherein the first key comprises a first seed key, the method further comprising:
detecting, by the processing system, that a resynchronization condition is met; and
transmitting, by the processing system, a notification to the sending system to use a second seed key.

18. The method of claim 13, wherein the processing system obtains, in a plurality of iterations, additional source data encodings and generates, in the plurality of iterations, additional key instances and additional decoded source data as outputs of the decoder.

19. The method of claim 13, wherein the encoder-decoder model comprises:
an autoencoder; or
a shallow encoder deep decoder network.

20. The method of claim 13, wherein the encoder-decoder model is trained in accordance with an information loss function associated with instances of source data, and a key loss function associated with key instances.

* * * * *